United States Patent

[11] 3,565,213

| [72] | Inventor | Morton Heller |
| --- | --- | --- |
| | | 1935 Shore Parkway, Brooklyn, N.Y. 11214 |
| [21] | Appl. No. | 786,880 |
| [22] | Filed | Dec. 26, 1968 |
| [45] | Patented | Feb. 23, 1971 |

[54] LUBRICATING MEANS AND METHOD FOR ELECTRICAL WIRING CONDUITS
13 Claims, 4 Drawing Figs.

[52] U.S. Cl............................................ 184/15;
141/386; 174/68; 184/105
[51] Int. Cl.............................................. F01m 11/04
[50] Field of Search............................... 184/15 (A),
105, 105(B), 1, 15 (Cursory), 24, 14; 141/383, 384, 386; 29/424; 174/68 (C); 74/501

[56] References Cited
UNITED STATES PATENTS

| 296,440 | 4/1884 | Oliver...................... | 184/(15UX) |
| 1,589,108 | 6/1926 | Caretta..................... | 74/501 |
| 1,690,658 | 11/1928 | Wilson...................... | 141/386X |
| 1,800,085 | 4/1931 | Kroeger et al............. | 184/(105UX) |

FOREIGN PATENTS

| 209,308 | 1/1924 | Great Britain............. | 184/15 |
| 563,001 | 7/1944 | Great Britain............. | 184/15 |
| 640,337 | 7/1950 | Great Britain............. | 184/15 |

*Primary Examiner*—Manuel A. Antonakas
*Attorney*—Harry Jacobson

ABSTRACT: Electrical wire or cable in a conduit having coupled relatively short pipe sections is lubricated through a temporary lubricant supplying fitting while pulling the wiring into and through the conduit. The fitting is screwed into an opening in each coupling or pipe section, which opening communicates with the interior of the conduit. Special greaselike lubricant is injected into the conduit through the fittings to assure adequate lubrication of the entire length of the conduit even though numerous pull boxes, ordinarily provided, are eliminated. After the lubrication of the conduit, the fittings are replaced by plugs.

PATENTED FEB 23 1971 3,565,213
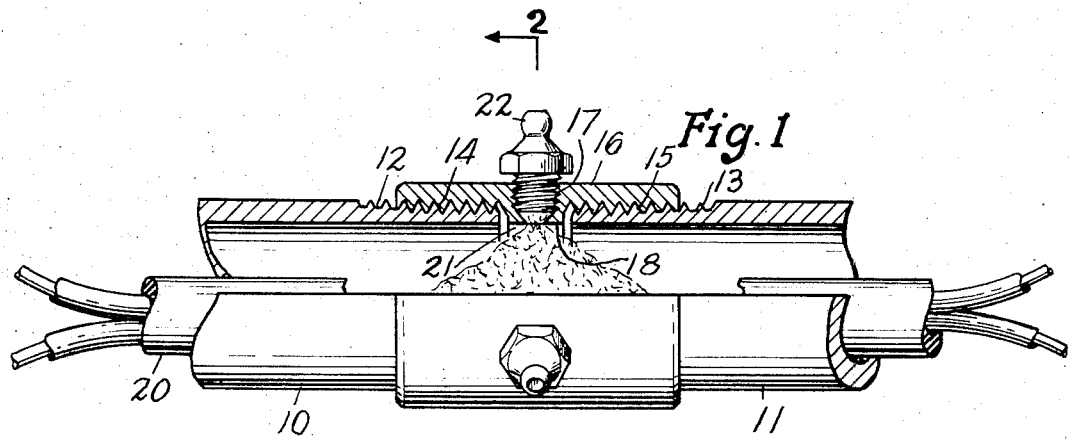
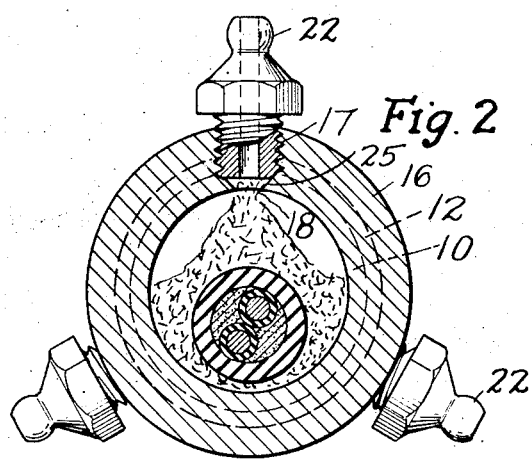
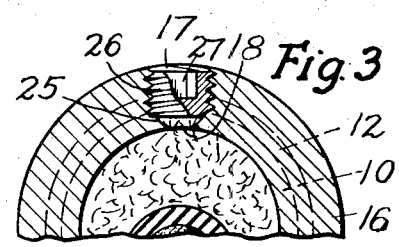
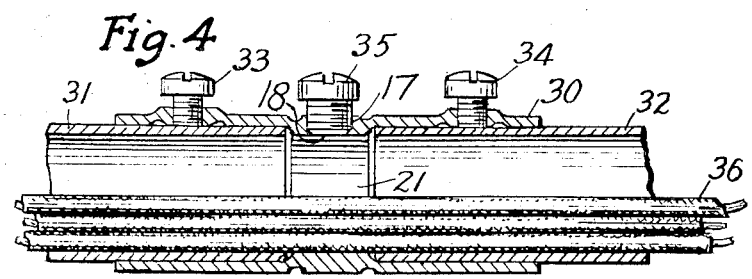
INVENTOR.
Morton Heller
BY
Harry Jacobson
ATTORNEY

LUBRICATING MEANS AND METHOD FOR ELECTRICAL WIRING CONDUITS

This invention relates to the means and method for lubricating electrical wires or cable as such wires or cable are pulled into and through a conduit therefor.

In what follows, electrical wires, cables or similar lengthy conductors will be referred to as "wiring" and the tube, pipe section or conduit including the fittings thereon, will be termed "conduit."

In existing codes of safety and practice, relatively large and expensive pull boxes or junction points are spaced-apart the usual distance of about 100 feet on a straight run of conduit. At sharp bends of small radius, upward inclines, verticals or where heavy cable or numerous wires are installed, the spacing between pull boxes must be substantially reduced owing to the excessive force required to overcome the friction between the wiring and the conduit and the difficulty of adequately lubricating the wiring on such runs or on long pulls. The ultimate tensile strength of the wiring is limited so that such force is quite likely to damage the wiring insulation or to stretch, damage or possibly rupture the wiring.

In the past, it has been customary to have a man at the insert point of the wiring into the conduit, who applies to the wiring, grease of a special type and in the form of a paste, the man also pushing the wiring into the conduit. Another man at the succeeding pull box or junction point pulls on and loops or withdraws and then reinserts and again greases the wiring to relieve the tension to which the wiring is subjected at the next pull box, it being the intention that a maximum of about 100 feet of wiring is ever pulled at one time. As the wiring is pulled along the conduit, it becomes difficult if not impossible quite frequently, to inject enough lubricant at the insert point for any to remain on the wiring until the leading portion of the wiring reaches or approaches close to the relatively large box at which the wiring is pulled. As the wiring moves along the conduit, almost all, if not all, of the lubricant comes off.

When this happens, the force required to haul the wiring the last part of the way to the pull box or around a bend or upwards, becomes excessive. Danger of damage to the wiring by reason of such excessive force is also dominant. Relatively close spacing of the expensive pull boxes is therefore essential at all points where considerable friction may develop or during installation of heavy or numerous wires or cable and especially on vertical runs where the weight of the wiring must be overcome during the pull. While the conduit is usually made up of relatively short pipe sections and fittings, for example 10 foot straight lengths, and are coupled together at such short intervals, it is the spacing between pull boxes or junction points and not that of the couplings which has determined the length of the wiring pull at any part of the entire length of the wiring. In practice, the hands of the men inserting and greasing the wiring became greased and slippery, thereby materially limiting the length of the pull.

The present invention is therefore directed to the means and method for so supplying lubricant in electrical wiring installations that thoroughly effective and complete lubrication is assured of runs of extraordinary and vastly increased lengths over past practice without excessive change in the materials used in the final assembly thereof, all in accordance with existing recognized codes of safety and practice.

The invention is further directed to the means and method for so reducing the friction between the wiring and the conduit as to make it possible to eliminate many of the pull boxes previously indispensible; to reduce the danger of stretch or other damage to the wiring or its insulation to a minimum; largely to eliminate the need to grease at the insert end of the conduit; to make it easy and inexpensive to remove and replace with serviceable wiring any of the wiring which may need repair or replacement; to decrease substantially the cost of installation of the conduit and wiring; to prelubricate the wiring on initial construction or again if needed on repair work; to employ lubricant supply means which is inexpensively adaptable to any of the usual types of tubes, pipes and conduits, cables, wiring and conduit couplings.

The invention is further directed to the provision of a conduit including pipe sections and a coupling for the pipe sections. Said conduit having one or more longitudinally and circumferentially closely spaced-apart openings. The pipe sections or coupling have a fitting screwed into each of the openings initially, for supplying lubricant under pressure to the conduit at selected openings, which may be as little as 10 feet or less apart. Each of the openings is easily plugged by a removable plug after the fitting is no longer needed and is removed. The coupling which has the openings has means for securing the pipe sections together with a space therebetween and also has means to prevent the plug or fitting from interfering with the movement of the wiring along the conduit.

The above and other objects of the invention will be clear as the description progresses and from the drawings, in which:

FIG. 1 is a fragmentary combined sectional and elevation view of a relatively heavy cable installation showing one form of the invention and with part of the cable broken away to expose the injected lubricant;

FIG. 2 is a cross-sectional view of the same taken on line 2—2 of FIG. 1;

FIG. 3 is a similar fragmentary view of the same but with the lubricant fitting of the opening shown, replaced by a substantially flush screw plug; and FIG. 4 is a longitudinal sectional view of a modified form of the installation showing another type of coupling as well as separate wires as the wiring.

In the practical embodiment of the invention shown by way of example in FIGS. 1—3, the pipe sections 10, 11 of the conduit are threaded at the respective end portions 12, 13 thereof to engage the respective screw threads 14, 15 of the waterproof sleeve coupling 16. Means are provided to prevent the entrance of the pipe sections too far into the coupling so that obstruction by any part of the conduit of the threaded opening 17 shown as located in the coupling is prevented. Said opening is made conveniently for the insertion of lubricant at approximately midway between the ends of the coupling or may be made in the pipe section if desired. As shown, the substantially smooth uninterrupted inner surface portion 18 is provided on a projection at the midportion of the coupling. Said surface 18 on the inwardly extending projecting has a diameter not greater than the inner diameter of the internal screw threads 14, 15 which threads are arranged respectively on opposite sides of the surface 18 and receive the threaded portions 12, 13 of the respective pipe sections. The adjacent pipe sections are thereby separated by the unthreaded middle part of the coupling to provide the space 21 therebetween into which space lubricant, conducted through the opening 17 is supplied and deposited on the inner surface of the conduit for transfer to the wiring 20 as the wiring is pulled during the installation.

Any number of circumferentially spaced-apart and preferably plugged openings 17 may be provided in the coupling or pipe section or both as required, three being shown, so as to have at least one opening always accessible for the replacement of a plug with a lubricating fitting even in places difficult to reach. Any grease fitting of the usual types adapted to cooperate with a grease gun may be used for temporary replacement of the selected plug.

Means are also provided on the coupling for limiting the movement of the fitting into the opening and thereby preventing movement of the fitting or other plugging element which makes the coupling watertight, into the space 21 and possibly coming into contact with and damaging the wiring. Said means comprises the annular projection or stop 25 of about the same inner diameter as that of the pipe sections 10 and 11. The opening 17 is reduced in diameter at the inner portion thereof to prevent movement of the end portion of the fitting past the surface 18.

After lubrication through the fitting has been completed, it is removed and the headless screw plug 26 replaced in the opening. The plug does not protrude beyond either the inner or outer surface of the coupling or pipe section and is preferably of lesser length than that of the opening 17 or the thickness of the coupling at the opening. In the watertight type of coupling, all of the openings 17 are preferably plugged with headless plugs when the pipes are screwed thereinto, especially as is quite usual, where the installation of the conduit is in close quarters. The end of the plug 26 may have any type of effective screw cut as 27 (FIG. 3) for the reception of a screwdriver, socket wrench or the like tool for driving the plug into final position as shown.

In the nonwaterproof form of the coupling installation shown in FIG. 4, the sleeve coupling 30 and the pipe sections 31, 32 are not threaded except that the coupling is provided with the threaded lubricant passage or opening 17 as in the form of FIGS. 1—3. Instead, set screws as 33, 34 on the coupling secure the pipe sections together with the space 21 therebetween. The opening 17 in the coupling 30 is similarly of reduced diameter at its inner end portion and similarly limits the axial movement of the plug toward the space 21. The plug 35 need not be headless because of the use of headed set screws 33, 34 which necessarily project beyond the outer surface of the coupling. However, said plug is arranged in alignment with the set screws as is the opening 17. The smooth surface 18 is also provided on the coupling 30. At least part of said surface is of lesser diameter than the outer diameter of the pipe sections to act as a stop preventing the entrance of said sections into the space 21.

In assembling the conduit, the usual procedure is followed, except that the coupling or pipe section of the present invention is employed and that pull boxes or other fixtures or pull points on straight runs may be as much as 500 feet apart or even more, and need be used only at those points where excessive friction is anticipated. The installation of the wiring does not require a man to grease and insert the wiring at an insert point. Instead, enough lubricant is injected into the conduit at the relatively closely spaced selected openings prior to pulling the wiring, to lubricate adequately and completely the entire run of wiring 20 or 36 regardless of its length, weight or volume, in distinction from the often insufficient supply of grease deposited by a wiring insert man at widely spaced-apart points through large, obstructive, ugly and necessarily exposed highly expensive pull boxes.

Should the wiring become defective and require repair or replacement, the lubricant initially inserted into the conduit is so completely adequate that it is usually sufficient to enable the removal and replacement of the defective wiring by serviceable wiring. However, if additional lubricant is required, it is readily supplied through a suitable lubricant fitting inserted into the selected opening 17 and temporarily replacing the plug 26 or 35.

The advantages of lubrication above set forth are not possible of attainment with previous installation methods and should now be obvious. They result from such reduction of friction by adequate lubrication that the force required to pull the wiring is reduced to a minimum with consequent considerable reduction in the cost not only of materials and labor but of installation time as well. The danger of damage to the wiring is also considerably reduced.

It will now be seen that the various objects of the invention have been adequately attained and that the invention is well adapted to meet the requirements of safety and practice as well as of practical use. While some forms of the invention have herein been shown and described, various obvious changes may be made therein without departing from the spirit of the invention defined by the appended claims.

I claim:

1. The method of installing electrical wiring in a conduit having pull points for wiring and coupled pipe sections comprising making openings in the conduit between pull points communicating with the interior of the conduit. Injecting sufficient lubricant into the conduit between pull points through selected openings closely enough together to assure the adequate lubrication and antifriction movement of wiring pulled through said conduit, pulling wiring through the lubricated conduit at relatively widely spaced-apart pull points and covering the openings.

2. The conduit lubricating method of claim 1, and when the wiring becomes defective, uncovering selected openings, repeating the lubricating step to lubricate the conduit and removing and replacing the defective wiring and recovering the openings.

3. The electrical wiring installation method of claim 1, making said openings in the conduit at the points where the pipe sections are coupled before assembling the conduit and before inserting lubricant into the conduit and closing said openings after the wiring has been installed in the conduit.

4. The electrical wire installing method of claim 1, making the openings in the conduit prior to the assembly of said pipe sections, assembling and installing said pipe sections with said openings closed, opening selected openings in the installed conduit to permit said injection of lubricant, said selected openings being covered after sufficient lubricant has been injected therethrough.

5. The method of installing electrical wiring in a conduit having relatively short tubular sections and having pull points for the wiring at widely spaced-apart longitudinal intervals each substantially greater than the length of the longest of said sections, said method comprising making a multiplicity of longitudinally spaced-apart openings through the thickness of the conduit between consecutive pull points to open communication between the outside and inside of the conduit, inserting wiring through an insert pull point into the conduit, inserting grease as required for complete lubrication of the wiring and conduit between pull points through selected openings into the interior of the conduit adjacent said openings prior to pulling the wiring past said selected openings, pulling the wiring through the conduit at the first pull point succeeding the insert pull point, greasing the interior of the conduit through said openings to the second pull point, reinserting the wiring into the conduit at said first pull point, repeating the grease-inserting and pulling steps through additional openings and pull points respectively for the length of the conduit and reinserting the wiring at successive pull points until the wiring is completely installed, and closing the openings after the greasing steps have been completed at said openings.

6. In an electrical wiring installation, a conduit having longitudinally spaced-apart pull fittings, the conduit comprising assembled pipe sections and being of substantially the same interval diameter throughout the length thereof and having an unobstructed interior surface, selected pipe sections each having a plurality of circumferentially spaced-apart openings at points between pull fittings for the insertion of lubricant into the conduit at points closer together than said pull fittings, at least one of said openings being accessible at each of said points in the installed position of said conduit at places difficult to reach and in close quarters, lubricant in the conduit adjacent selected openings, relatively fragile insulated wiring arranged loosely in the conduit to occupy a relatively small cross-sectional area thereof and adapted to be pulled safely into and through the conduit at said pull fittings while passing through said lubricant and removable means normally closing said openings.

7. The installation of claim 6, the conduit pipe sections each being shorter than the distance between pull fittings, selected pipe sections being couplings each connecting adjacent ends of a pair of adjacent pipe sections, selected couplings each having said plurality of circumferentially spaced-apart openings therein.

8. For use in the electrical wiring installation of claim 6 wherein the conduit loosely encloses the electrical wiring, a coupling provided with means to connect adjacent pipe sections together, with the end edges of said sections in longitudinal spaced relation to each other, thereby to maintain a space between said end edges for the reception and distribution of lubricant through a substantial length of the conduit greater than the length of said coupling, said coupling having a plurality of said circumferentially spaced-apart openings through the wall thereof, each opening being reduced in diameter at the inner end thereof, at least one of said openings being that which is accessible for the injection of lubricant therethrough into said space when the coupling is assembled to said pipe sections and the conduit is installed in place, the reduced end portion of each of said openings preventing the intrusion of said removable means into said space thereby to prevent injury to said wiring when said wiring is drawn through said coupling past said space in the installed position of the coupling in said conduit.

9. The coupling of claim 8, said coupling having an annular projecting extending inwardly from the remainder of the inner surface thereof and surrounding said space, the inner diameter of the projection being insufficient to obstruct passage of said wiring to an extent injurious to the insulation thereon, said diameter being sufficient to maintain the end portions of the pipe sections joined by said coupling in longitudinal spaced relation to each other, said plurality of openings extending through said projection.

10. An electrical conduit coupling adapted to connect adjacent pipe sections of the wiring installation of claim 6, comprising a tubular member having said plurality of circumferentially spaced-apart openings therein and said removable means entering into and plugging said openings, said coupling having an annular inwardly extending projection protruding past the remainder of the inner surface thereof, said openings passing through said projection and communicating with the interior of said coupling and being at least three in number, and means associated with the projection for preventing intrusion of said removable plugging means into the interior of said coupling past the inner surface of said projection, said plugging means being reinsertable into said openings after lubricant has been injected through a selected one of said openings into the interior of said coupling.

11. An electrical wiring installation comprising a conduit having pipe sections, means for connecting said sections and pull points spaced-apart distances greater than the lengths of the respective sections, electrical wiring in said conduit comprising a plurality of electrical conductors each having relatively fragile insulation thereon, said wiring loosely occupying part of the cross-sectional area of the conduit throughout the length of the conduit and being immobile therein, the inner surface of the conduit being unobstructed and of substantially the same diameter throughout the entire length of the conduit to permit free and unobstructing installing movement of the wiring thereinto, the conduit having a sufficient plurality of circumferentially spaced-apart openings through the wall thereof for the insertion of lubricant into the path of said wiring when said wiring is inserted into and pulled through the conduit whereby at least one of said openings is accessible in installed positions of the conduit in proximity to surfaces obstructing others of said openings and removable means in outward spaced relation to the inner surface of the conduit normally plugging each of said openings by entering thereinto.

12. The installation of claim 11, said openings being spaced-apart longitudinally distances less than the distances between pull points, each of said openings being reduced in diameter at the inner end thereof to prevent said plugging means from entering the interior of said conduit, the conduit being rigid and lubricant distributed throughout the length of said inner surface in the immobile position of the wiring.

13. An electrical wiring installation according to claim 9, a conduit having pipe sections including couplings connecting adjacent pipe sections, the conduit being of uniform internal diameter throughout the length thereof to provide an unobstructed inner surface and a plurality of electrical conductors in said conduit occupying only part of the cross-sectional area of said inner surface and each having relatively fragile insulation susceptible of damage when pulled past a projection on the inner surface of the conduit and lubricant along the entire length of said inner surface, the conductors being immobile within the conduit.

UNITED STATES PATENT OFFICE
CERTIFICATE OF CORRECTION

Patent No. 3,565,213                    Dated Feb. 23, 1971

Inventor(s) Morton Heller

It is certified that error appears in the above-identified patent and that said Letters Patent are hereby corrected as shown below:

Column 2, line 42, "projecting" should read -- projectio
Column 3, line 69, "conduit. Injecting" should read -- conduit, injecting --.
Column 4, line 44, "terval" should read -- ternal --.
Column 5, line 9, "projecting" should read -- projection Signed and sealed this 18th day of April 1972.

(SEAL)
Attest:

EDWARD M.FLETCHER,JR.                   ROBERT GOTTSCHALK
Attesting Officer                       Commissioner of Paten